US012694394B2

(12) United States Patent
Rule et al.

(10) Patent No.: US 12,694,394 B2
(45) Date of Patent: Jul. 28, 2026

(54) DELEGATED ADMINISTRATION OF PERMISSIONS USING A CONTACTLESS CARD

(71) Applicant: Capital One Services, LLC, McLean, VA (US)

(72) Inventors: Jeffrey Rule, Chevy Chase, MD (US); Walter A. Miller, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/743,213

(22) Filed: Jun. 14, 2024

(65) Prior Publication Data

US 2024/0338677 A1      Oct. 10, 2024

Related U.S. Application Data

(63) Continuation of application No. 17/527,534, filed on Nov. 16, 2021, now Pat. No. 12,045,804, which is a
(Continued)

(51) Int. Cl.
| | |
|---|---|
| *G06Q 20/34* | (2012.01) |
| *G06Q 20/38* | (2012.01) |
(Continued)

(52) U.S. Cl.
CPC ....... *G06Q 20/352* (2013.01); *G06Q 20/3829* (2013.01); *G06Q 20/405* (2013.01); *H04L 9/3234* (2013.01); *G06Q 2220/00* (2013.01)

(58) Field of Classification Search
CPC .................. G06Q 20/00–425; H04L 9/00–50
See application file for complete search history.

(56) References Cited

U.S. PATENT DOCUMENTS

| | | | |
|---|---|---|---|
| 5,590,038 | A | 12/1996 | Pitroda |
| 5,666,415 | A | 9/1997 | Kaufman |
(Continued)

FOREIGN PATENT DOCUMENTS

| | | |
|---|---|---|
| CN | 101192295 A | 6/2008 |
| CN | 102882834 A | 1/2013 |
(Continued)

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
(Continued)

*Primary Examiner* — Ari Shahabi
(74) *Attorney, Agent, or Firm* — KDW Firm PLLC

(57)      ABSTRACT

Delegated administration of permissions using a contactless card. In one example, a permissions module may receive a request from a first account to grant a second account access to a computing resource. The permissions module may receive permissions data of the first account from a contactless card and encrypted data generated by the contactless card. The permissions module may transmit the permissions data and the encrypted data to an authentication server, which may verify the encrypted data based at least in part on the private key, and determine, based on the permissions data, that the first account has permissions to grant access to the computing resource. The permissions module may receive, from the authentication server, an indication of the verification of the encrypted data and a permissions vector associated with the second account, the permissions vector
(Continued)

reflecting the grant of access to the computing resource to the second account.

20 Claims, 14 Drawing Sheets

Related U.S. Application Data continuation of application No. 17/184,963, filed on Feb. 25, 2021, now Pat. No. 11,922,398, which is a continuation of application No. 16/360,149, filed on Mar. 21, 2019, now Pat. No. 10,970,712.

(51) Int. Cl.
  *G06Q 20/40* (2012.01)
  *H04L 9/32* (2006.01)

(56) References Cited

U.S. PATENT DOCUMENTS

| | | | |
|---|---|---|---|
| 6,199,114 B1 | 3/2001 | White | |
| 6,324,271 B1 | 11/2001 | Sawyer | |
| 6,367,011 B1 | 4/2002 | Lee | |
| 6,572,015 B1 | 6/2003 | Norton | |
| 7,252,242 B2 | 8/2007 | Ho | |
| 7,270,276 B2 | 9/2007 | Vayssiere | |
| 7,287,692 B1 | 10/2007 | Patel | |
| 7,374,099 B2 | 5/2008 | de Jong | |
| 7,527,208 B2 | 5/2009 | Hammad | |
| 7,568,631 B2 | 8/2009 | Gibbs | |
| 7,584,153 B2 | 9/2009 | Brown | |
| 7,628,322 B2 | 12/2009 | Holtmanns | |
| 7,793,851 B2 | 9/2010 | Mullen | |
| 7,801,799 B1 | 9/2010 | Brake, Jr. | |
| 7,908,216 B1 | 3/2011 | Davis | |
| 7,922,082 B2 | 4/2011 | Muscato | |
| 8,010,405 B1 | 8/2011 | Bortolin | |
| 8,074,877 B2 | 12/2011 | Mullen | |
| 8,082,450 B2 | 12/2011 | Frey | |
| 8,108,687 B2 | 1/2012 | Ellis | |
| 8,186,602 B2 | 5/2012 | Itay | |
| 8,196,131 B1 | 6/2012 | Von Behren | |
| 8,249,654 B1 | 8/2012 | Zhu | |
| 8,276,814 B1 | 10/2012 | Davis | |
| 8,332,272 B2 | 12/2012 | Fisher | |
| 8,346,670 B2 | 1/2013 | Hasson | |
| 8,511,547 B2 | 8/2013 | Rans | |
| 8,519,822 B2 | 8/2013 | Riegebauer | |
| 8,750,514 B2 | 6/2014 | Gallo | |
| 8,870,081 B2 | 10/2014 | Olson | |
| 9,038,893 B2 | 5/2015 | Kirkham | |
| 9,129,199 B2 | 9/2015 | Spodak | |
| 9,183,490 B2 | 11/2015 | Moreton | |
| 9,275,325 B2 | 3/2016 | Newcombe | |
| 9,286,606 B2 | 3/2016 | Diamond | |
| 9,306,753 B1 | 4/2016 | Vandervort | |
| 9,501,776 B2 | 11/2016 | Martin | |
| 9,710,744 B2 | 7/2017 | Wurmfeld | |
| 9,741,036 B1 * | 8/2017 | Grassadonia | G06Q 20/405 |
| 9,949,065 B1 | 4/2018 | Zarakas | |
| 9,965,632 B2 | 5/2018 | Zarakas | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld | |
| 9,990,795 B2 | 6/2018 | Wurmfeld | |
| 10,007,873 B2 | 6/2018 | Heo | |
| 10,013,693 B2 | 7/2018 | Wyatt | |
| 10,121,130 B2 | 11/2018 | Pinski | |
| 10,210,505 B2 | 2/2019 | Zarakas | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |

| | | | |
|---|---|---|---|
| 10,380,471 B2 | 8/2019 | Locke | |
| 10,395,244 B1 | 8/2019 | Mossler | |
| 10,453,054 B2 | 10/2019 | Zarakas | |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,797,882 B2 | 10/2020 | Rule | |
| 10,880,741 B2 | 12/2020 | Zarakas | |
| 10,909,525 B1 | 2/2021 | Dhodapkar | |
| 10,970,691 B2 | 4/2021 | Koeppel | |
| 10,984,416 B2 | 4/2021 | Ilincic | |
| 11,037,136 B2 | 6/2021 | Rule | |
| 11,062,098 B1 | 7/2021 | Bergeron | |
| 11,120,453 B2 | 9/2021 | Rule | |
| 11,138,593 B1 | 10/2021 | Ho | |
| 11,138,605 B2 | 10/2021 | Aabye | |
| 11,176,540 B2 | 11/2021 | Gupta | |
| 11,188,908 B2 | 11/2021 | Locke | |
| 11,216,806 B2 | 1/2022 | Mossler | |
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 | 8/2022 | Ho | |
| 11,443,292 B2 | 9/2022 | Sherif | |
| 11,444,770 B2 | 9/2022 | Wieker | |
| 11,461,764 B2 | 10/2022 | Rule | |
| 11,481,764 B2 | 10/2022 | Shakkarwar | |
| 11,521,213 B2 | 12/2022 | Rule | |
| 11,551,200 B1 | 1/2023 | Cook | |
| 11,556,918 B2 | 1/2023 | Mestre | |
| 11,615,395 B2 | 3/2023 | McHugh | |
| 11,777,933 B2 | 10/2023 | Moreton | |
| 2003/0220876 A1 | 11/2003 | Burger | |
| 2005/0156026 A1 | 7/2005 | Ghosh | |
| 2005/0228997 A1 | 10/2005 | Bicker | |
| 2005/0269402 A1 | 12/2005 | Spitzer | |
| 2007/0061456 A1 | 3/2007 | Waris | |
| 2007/0276765 A1 | 11/2007 | Hazel | |
| 2008/0082452 A1 | 4/2008 | Wankmueller | |
| 2008/0099552 A1 | 5/2008 | Grillion | |
| 2009/0143104 A1 | 6/2009 | Loh | |
| 2009/0235339 A1 | 9/2009 | Mennes | |
| 2009/0282264 A1 | 11/2009 | Amiel | |
| 2010/0287373 A1 | 11/2010 | Johnson et al. | |
| 2011/0113245 A1 | 5/2011 | Varadarajan | |
| 2011/0155801 A1 | 6/2011 | Rowberry | |
| 2011/0271108 A1 * | 11/2011 | Kale | G06F 21/6218 |
| | | | 713/168 |
| 2012/0143703 A1 | 6/2012 | Wall | |
| 2013/0030997 A1 | 1/2013 | Spodak | |
| 2013/0146657 A1 | 6/2013 | Graef | |
| 2013/0211937 A1 | 8/2013 | Elbirt | |
| 2013/0311363 A1 | 11/2013 | Ramaci | |
| 2014/0074637 A1 | 3/2014 | Hammad | |
| 2014/0074655 A1 | 3/2014 | Lim | |
| 2014/0081785 A1 | 3/2014 | Valadas Preto | |
| 2014/0189799 A1 | 7/2014 | Lu | |
| 2014/0365377 A1 | 12/2014 | Salama | |
| 2015/0032635 A1 | 1/2015 | Guise | |
| 2015/0073983 A1 | 3/2015 | Bartenstein | |
| 2015/0113271 A1 | 4/2015 | Jooste | |
| 2015/0134513 A1 | 5/2015 | Olson | |
| 2015/0199673 A1 | 7/2015 | Savolainen | |
| 2015/0199863 A1 | 7/2015 | Scoggins | |
| 2015/0254637 A1 | 9/2015 | Yang | |
| 2015/0317295 A1 | 11/2015 | Sherry | |

(56) References Cited

U.S. PATENT DOCUMENTS

| | | | |
|---|---|---|---|
| 2016/0078430 A1 | 3/2016 | Douglas | |
| 2016/0189143 A1 | 6/2016 | Koeppel | |
| 2016/0253651 A1 | 9/2016 | Park | |
| 2016/0277383 A1 | 9/2016 | Guyomarc'h | |
| 2016/0307189 A1 | 10/2016 | Zarakas | |
| 2016/0314472 A1 | 10/2016 | Ashfield | |
| 2016/0379217 A1 | 12/2016 | Hammad | |
| 2017/0017957 A1 | 1/2017 | Radu | |
| 2017/0039566 A1 | 2/2017 | Schipperheijn | |
| 2017/0068950 A1 | 3/2017 | Kwon | |
| 2017/0330173 A1 | 11/2017 | Woo | |
| 2018/0039987 A1 | 2/2018 | Molino | |
| 2018/0268132 A1 | 9/2018 | Buer | |
| 2018/0300716 A1 | 10/2018 | Carlson | |
| 2019/0172055 A1 | 6/2019 | Hale | |
| 2019/0303945 A1 | 10/2019 | Mitra | |
| 2020/0286071 A1* | 9/2020 | Oepping | H04L 9/3234 |
| 2021/0004806 A1 | 1/2021 | Noe | |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | | |
|---|---|---|---|
| GB | 2516861 A | 2/2015 | |
| GB | 2551907 A | 1/2018 | |
| JP | 2008158681 A | 7/2008 | |
| KR | 20100091059 A | 8/2010 | |
| KR | 20120041904 A | 5/2012 | |
| KR | 20150101016 A | 9/2015 | |
| KR | 20150140132 A | 12/2015 | |
| WO | 9910824 A1 | 3/1999 | |
| WO | 0049586 A1 | 8/2000 | |
| WO | 2013155562 A1 | 10/2013 | |
| WO | 2015183818 A1 | 12/2015 | |
| WO | 2017007662 A1 | 1/2017 | |
| WO | 2017047855 A1 | 3/2017 | |
| WO | 2019022585 A1 | 1/2019 | |
| WO | 2021051884 A1 | 3/2021 | |
| WO | 2021133492 A1 | 7/2021 | |
| WO | 2022108959 A1 | 5/2022 | |
| WO | 2022187350 A1 | 9/2022 | |
| WO | 2023017943 A1 | 2/2023 | |
| WO | 2023064063 A1 | 4/2023 | |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

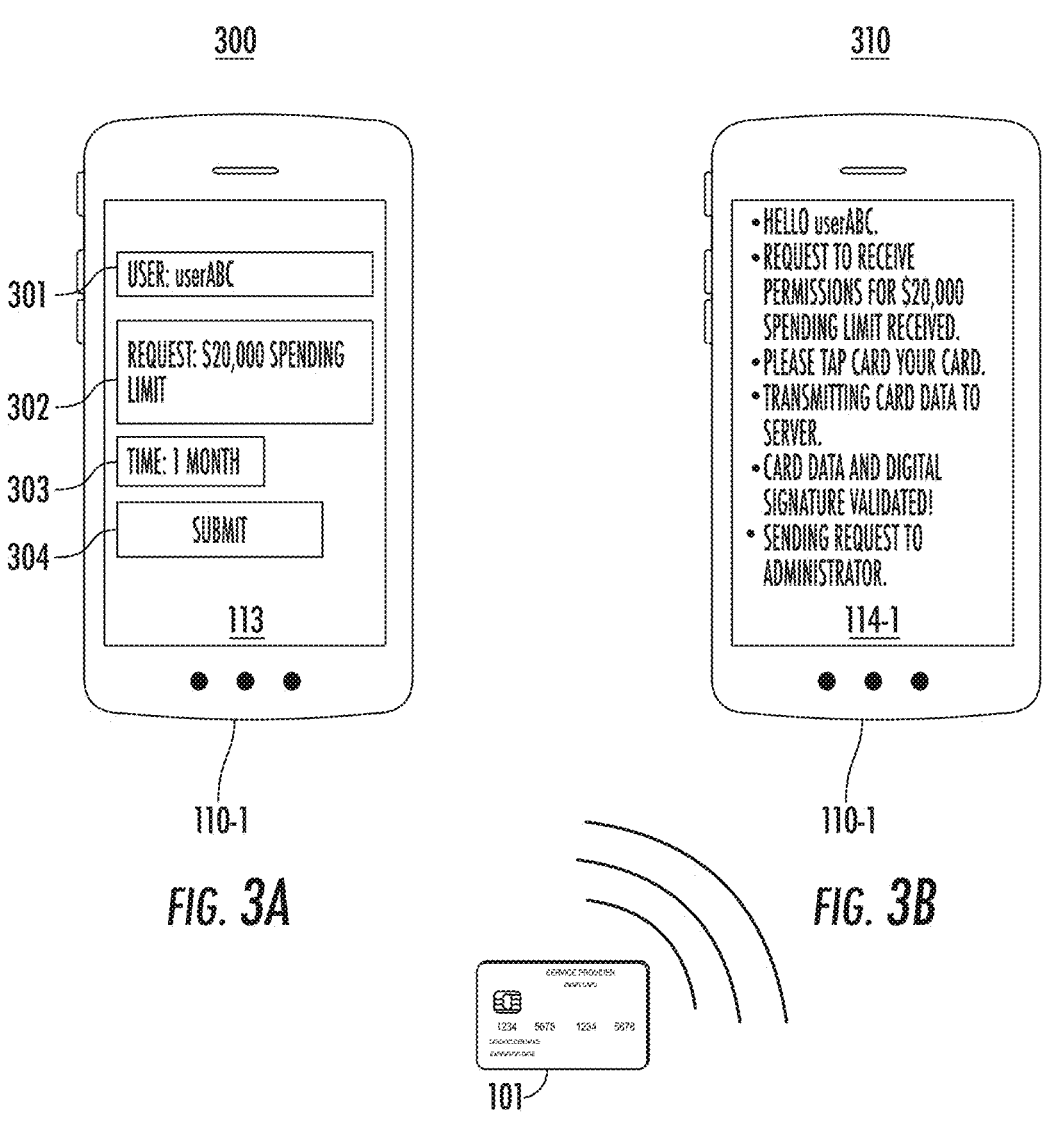
FIG. 3A                  FIG. 3B

320

WELCOME ADMINISTRATOR!

305 — USER: userABC

306 — REQUEST: $20,000 SPENDING LIMIT

307 — TIME: 1 MONTH

308 — APPROVE 114-1

110-2

330

- REQUEST TO APPROVE PERMISSIONS RECEIVED.
- PLEASE TAP CARD.
- TRANSMITTING CARD DATA TO SERVER.
- CARD DATA VALIDATED!
- PERMISSIONS GRANTED! userABC NOW HAS A $20,000 SPENDING LIMIT.

114-1

110-2

101

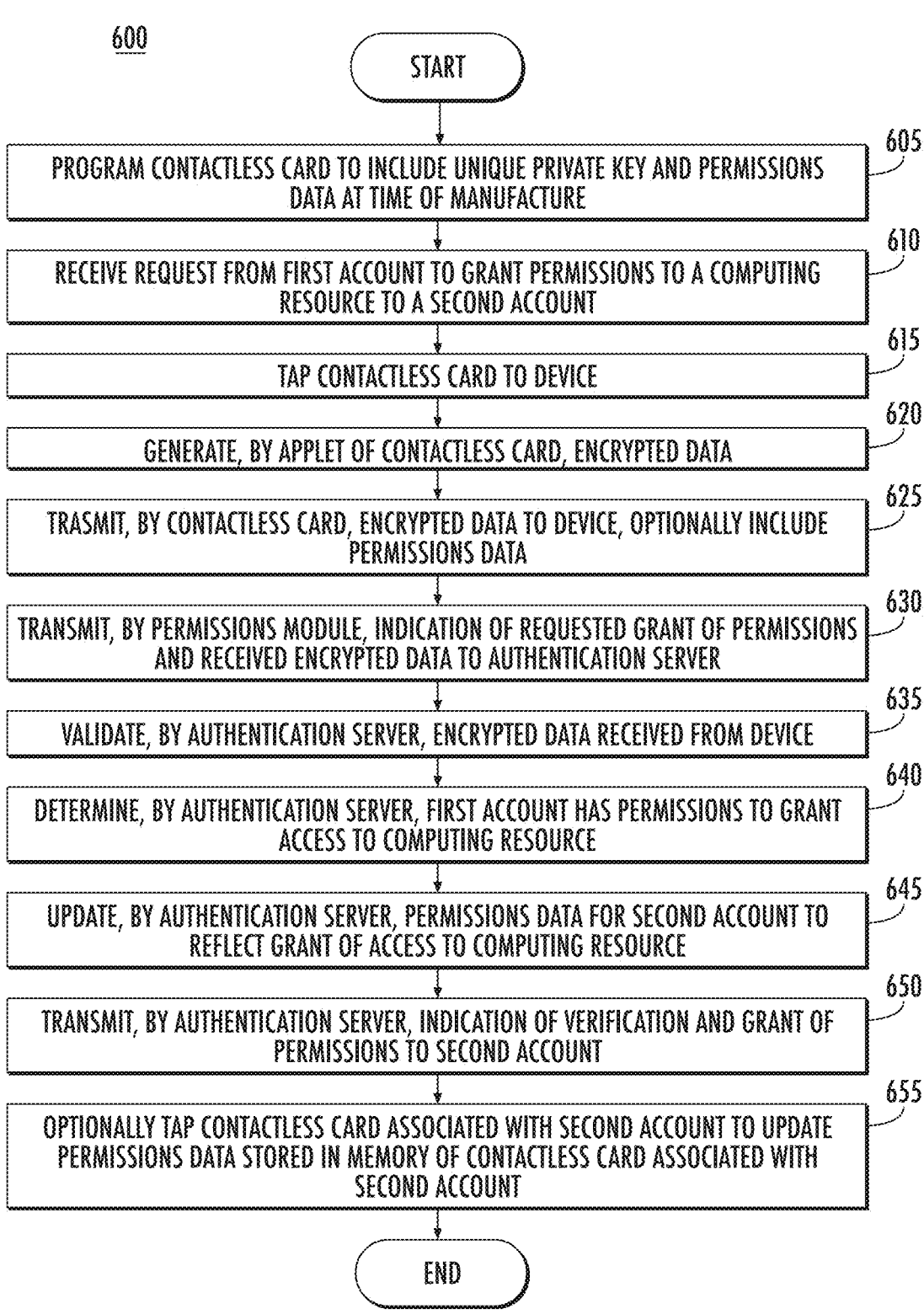

600

START

605
PROGRAM CONTACTLESS CARD TO INCLUDE UNIQUE PRIVATE KEY AND PERMISSIONS DATA AT TIME OF MANUFACTURE

610
RECEIVE REQUEST FROM FIRST ACCOUNT TO GRANT PERMISSIONS TO A COMPUTING RESOURCE TO A SECOND ACCOUNT

615
TAP CONTACTLESS CARD TO DEVICE

620
GENERATE, BY APPLET OF CONTACTLESS CARD, ENCRYPTED DATA

625
TRASMIT, BY CONTACTLESS CARD, ENCRYPTED DATA TO DEVICE, OPTIONALLY INCLUDE PERMISSIONS DATA

630
TRANSMIT, BY PERMISSIONS MODULE, INDICATION OF REQUESTED GRANT OF PERMISSIONS AND RECEIVED ENCRYPTED DATA TO AUTHENTICATION SERVER

635
VALIDATE, BY AUTHENTICATION SERVER, ENCRYPTED DATA RECEIVED FROM DEVICE

640
DETERMINE, BY AUTHENTICATION SERVER, FIRST ACCOUNT HAS PERMISSIONS TO GRANT ACCESS TO COMPUTING RESOURCE

645
UPDATE, BY AUTHENTICATION SERVER, PERMISSIONS DATA FOR SECOND ACCOUNT TO REFLECT GRANT OF ACCESS TO COMPUTING RESOURCE

650
TRANSMIT, BY AUTHENTICATION SERVER, INDICATION OF VERIFICATION AND GRANT OF PERMISSIONS TO SECOND ACCOUNT

655
OPTIONALLY TAP CONTACTLESS CARD ASSOCIATED WITH SECOND ACCOUNT TO UPDATE PERMISSIONS DATA STORED IN MEMORY OF CONTACTLESS CARD ASSOCIATED WITH SECOND ACCOUNT

END

FIG. 6

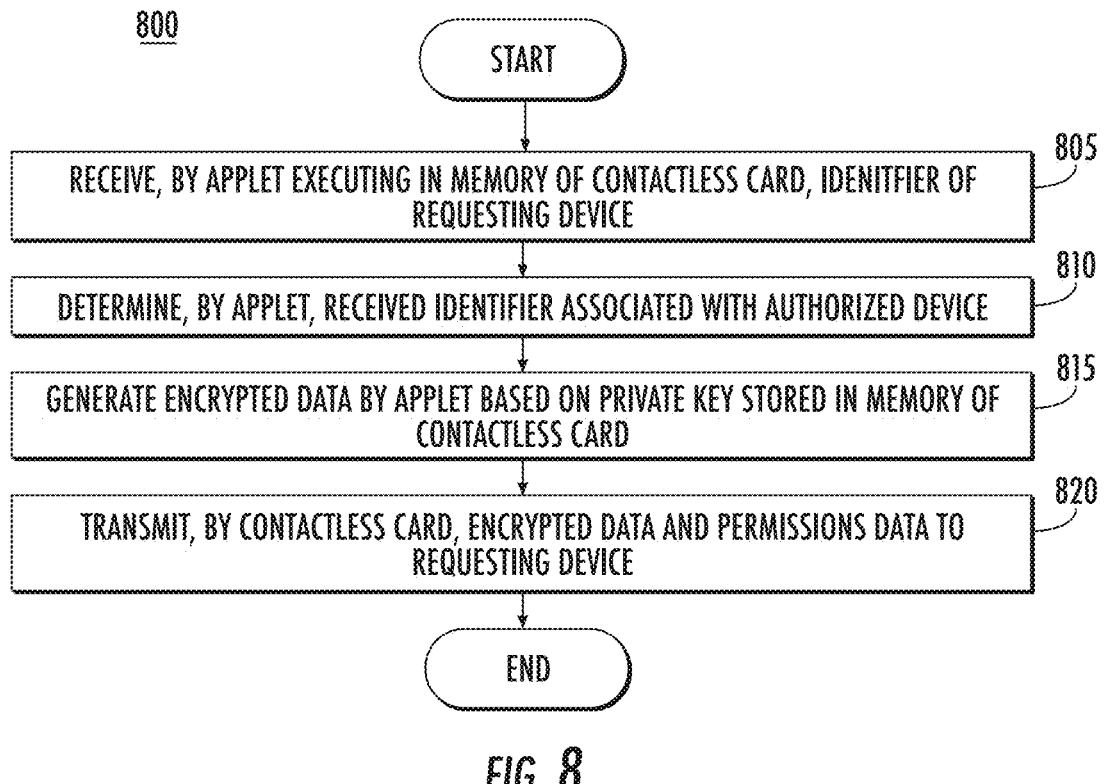

800

START

RECEIVE, BY APPLET EXECUTING IN MEMORY OF CONTACTLESS CARD, IDENITFIER OF REQUESTING DEVICE — 805

DETERMINE, BY APPLET, RECEIVED IDENTIFIER ASSOCIATED WITH AUTHORIZED DEVICE — 810

GENERATE ENCRYPTED DATA BY APPLET BASED ON PRIVATE KEY STORED IN MEMORY OF CONTACTLESS CARD — 815

TRANSMIT, BY CONTACTLESS CARD, ENCRYPTED DATA AND PERMISSIONS DATA TO REQUESTING DEVICE — 820

END

FIG. 8

DELEGATED ADMINISTRATION OF PERMISSIONS USING A CONTACTLESS CARD

CROSS-REFERENCE TO RELATED APPLICATIONS

This application is a continuation of U.S. patent application Ser. No. 17/527,534, filed on Nov. 16, 2021, which is a continuation of U.S. patent application Ser. No. 17/184,963, filed on Feb. 25, 2021 (issued as U.S. Pat. No. 11,922,398 on Feb. 25, 2021), which is a continuation of U.S. patent application Ser. No. 16/360,149, filed on Mar. 21, 2019 (issued as U.S. Pat. No. 10,970,712 on Apr. 6, 2021). The contents of the aforementioned patent applications are incorporated herein by reference in their entireties.

TECHNICAL FIELD

Embodiments herein generally relate to computing platforms, and more specifically, to delegated administration of permissions using a contactless card.

BACKGROUND

Users often must have permissions to access computing resources and/or perform actions using computing resources. The complexity and difficulty in managing permissions in an organization increases as the number of users in the organization increase. Conventional solutions to managing permissions require substantial user effort and often lack robust security measures.

SUMMARY

Embodiments disclosed herein provide systems, methods, articles of manufacture, and computer-readable media for delegated administration of permissions using a contactless card. In one example, a permissions module may receive a request from a first account to grant a second account access to a computing resource, the computing resource comprising one or more of: (i) an application, (ii) a data, and (iii) an operation performed using the application. The permissions module may receive, from a communications interface of a contactless card associated with the first account, permissions data associated with the first account and encrypted data generated by the contactless card, an applet of the contactless card to generate the encrypted data based at least in part on a private key for the contactless card stored in a memory of the contactless card. The permissions module may transmit the permissions data and the encrypted data to an authentication server. The authentication server may verify the encrypted data by decrypting the encrypted data based at least in part on a private key for the contactless card associated with the first account stored in a memory of the authentication server, and determine, based on the permissions data associated with the first account, that the first account has permissions to grant access to the computing resource to the second account. The permissions module may receive, from the authentication server, an indication of the verification of the encrypted data and a permissions vector associated with the second account, the permissions vector reflecting the grant of access to the computing resource to the second account.

BRIEF DESCRIPTION OF THE DRAWINGS

FIGS. 3A-3F illustrate embodiments of delegated administration of permissions using a contactless card.

FIG. 6 illustrates an embodiment of a first logic flow.

FIG. 8 illustrates an embodiment of a third logic flow.

DETAILED DESCRIPTION

Figure 1A:
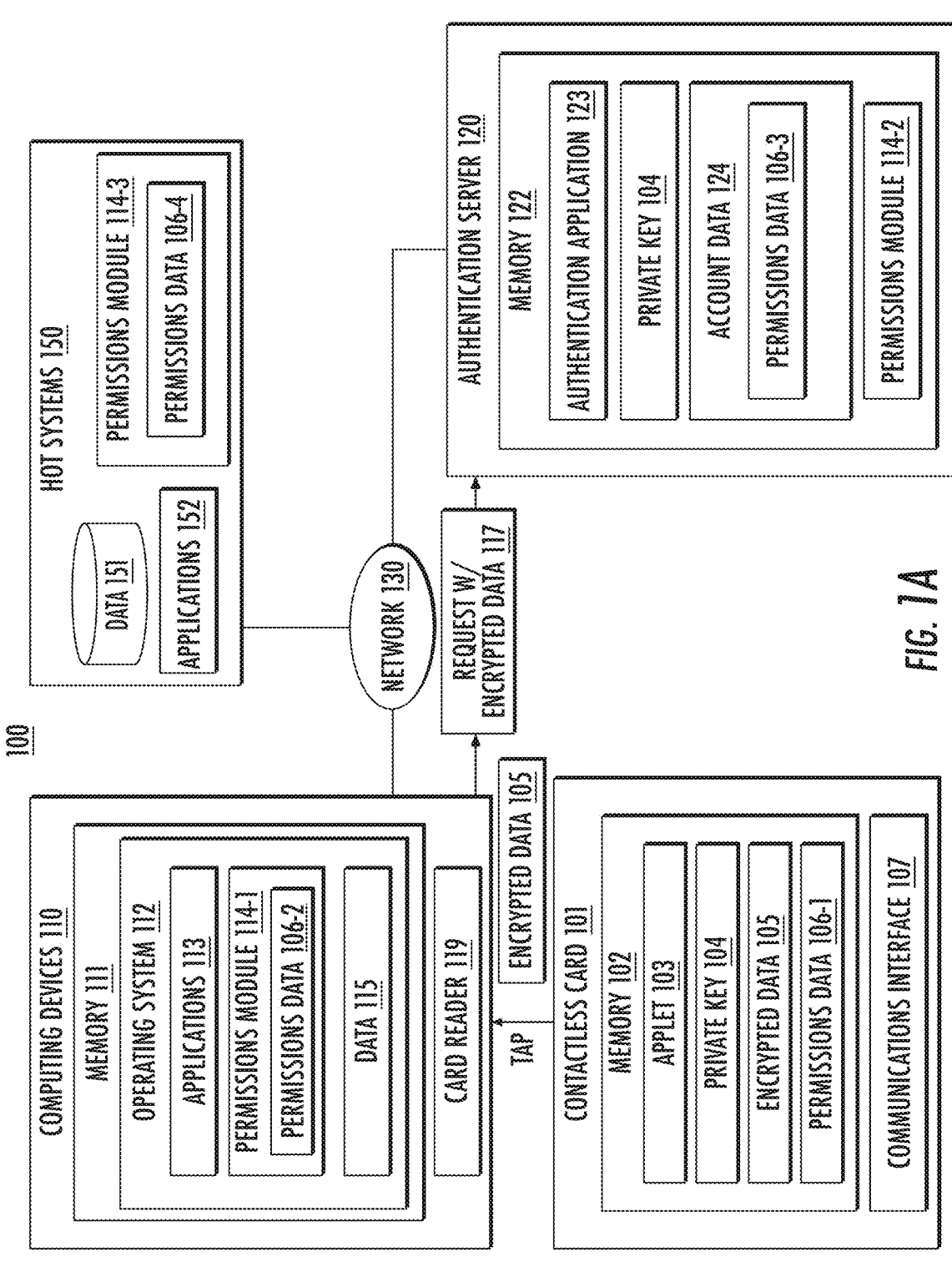
FIGS. 1A-1B illustrate embodiments of a system that implements delegated administration of permissions using a contactless card.

Embodiments disclosed herein provide secure techniques to use a contactless card for delegated administration of permissions. Generally, during the manufacturing of a contactless card, the contactless card is personalized to include data for an associated user. For example, a memory of the contactless card may store one or more applets, a private key, card data (e.g., an account number, etc.), and permissions data. The user associated with the contactless card may then delegate permissions, access resources, and/or perform operations using the contactless card.

For example, a first user may wish to access data stored in a database via a computing device. A permissions module may control access to the database and may output a notification specifying that the user tap their contactless card to the computing device. The user may then tap their contactless card to the computing device, which may cause the contactless card to come within communications range of the computing device. Doing so causes the applet executing in the contactless card to generate encrypted data using the private key which is then transmitted to the computing device along with the permissions data stored in the memory of the contactless card. The permissions module may receive the encrypted data generated by the contactless card and the permissions data and transmit the received data to an authentication server for validation. The authentication server may then validate the encrypted data using a copy of the private key stored in a memory (or other secure element, such as a hardware security module (HSM)) of the server. If the authentication server can decrypt the encrypted data using the private key, the authentication server validates the encrypted data and transmits an indication of the validation to the permissions module. In some embodiments, the authentication server transmits an instance of the permissions data for the user to the permissions module. The permissions module may then permit the user to access the data stored in the database based on the receipt of the indication of the validation of the encrypted data by the authentication server.

Advantageously, embodiments disclosed herein improve the security of devices, applications, and/or data. For example, by requiring validation of encrypted data generated by the contactless card to access applications and/or data, the security of the applications and/or data are improved. As another example, by requiring validation of the encrypted data prior to performing operations (e.g., making purchases, extending credit, etc.), the security of such operations and associated assets is improved. Further still, by requiring validation of the encrypted data as a condition to any attempts to delegate permissions, the security of delegated administration of permissions is improved.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more computing devices 110, one or more authentication servers 120, and one or more host systems 150. The contactless cards 101 are representative of any type of payment card, such as a credit card, debit card, ATM card, gift card, and the like. The contactless cards 101 may comprise one or more communications interfaces 107, such as a radio frequency identification (RFID) chip, configured to communicate with the computing devices 110 via NFC, the EMV standard, or other short-range protocols in wireless communication. Although NFC is used as an example communications protocol, the disclosure is equally applicable to other types of wireless communications, such as Bluetooth, and/or Wi-Fi. The computing devices 110 are representative of any type of network-enabled computing devices, such as smartphones, tablet computers, wearable devices, laptops, portable gaming devices, mobile devices, workstations, desktop computers, servers, and the like. The authentication server 120 and host systems 150 are representative of any type of computing device, such as a server, workstation, compute cluster, cloud computing platform, virtualized computing system, and the like.

As shown, a memory 111 of the computing device 110 includes an instance of an operating system (OS) 112. Example operating systems 112 include the Android® OS, iOS®, Linux®, macOS®, and Windows® operating systems. As shown, the OS 112 includes one or more applications 113, an instance of a permissions module 114-1, and data 115. The applications 113 are representative of any type of executable code, such as applications, services, scripts, and the like. The data 115 is representative of any data stored in a computer-readable medium. Although depicted as being stored in the memory 102, the data 115 may be stored in a non-volatile storage of the computing devices 110 (or communicably attached to the computing devices 110).

The permissions module 114 (including the permissions module 114-1, the permissions module 114-2 of the server 120, and the permissions module 114-3 of the host systems 150) is generally configured to implement delegated permissions in the system 100 by confirming that an actor attempting to perform an operation has the requisite permissions as reflected in the permissions data 106 (including instances of permissions data 106-1, 106-2, 106-3, and 106-4). The permissions data 106 is representative of any data structure that reflects whether an associated user is allowed to perform an attempted operation and/or access a given resource. For example, the permissions data 106 may be a vector, where each element of the vector reflects whether the user can perform an attempted operation and/or access a given resource. The attempted operations may include any type of operation, such as users (e.g., administrators) granting, modifying, and/or revoking permissions to other users. Additional examples of attempted operations include executing applications (e.g., the applications 113 of the computing devices 110, the applications 152 of the host systems 150, etc.), accessing a specific feature and/or interface of an application, accessing data (e.g., the data 115 of the computing devices 110, the data 151 of the host systems 150, etc.), and performing operations using an application and/or data. Although depicted as a separate entity, the permissions module 114 and/or associated functionality described herein may be integrated into the OS 112, the applications 113, the applications 152, and/or any other permissions management platform. Therefore, the particular configuration depicted in FIGS. 1A-1B should not be considered limiting of the disclosure.

The permissions module 114 may further consider data generated by the contactless card 101 when determining whether to grant and/or deny an attempted operation. For example, a system administrator may use a permissions application 113 to grant a new employee access to an accounting application 113 and corresponding accounting data 151 of the host systems 150. The permissions module 114-1 and receive an indication of the attempted delegation of permissions from the permissions application 113 and/or the OS 112. The permissions module 114-1 may output a notification on the administrator's computing device 110 to complete the attempted delegation of permissions. The notification may instruct the user to tap the contactless card 101 to the computing device 110, thereby bringing the contactless card 101 sufficiently close to the card reader 119 of the computing device 110 to enable data transfer (e.g., NFC data transfer, Bluetooth data transfer, etc.) between the communications interface 107 of the contactless card 101 and the card reader 119 of the computing device 110. In some embodiments, the computing device 110 may trigger the card reader 119 via an application program interface (API) call. In one example, the computing device 110 triggers the card reader via an API call responsive to the receiving an indication of an attempted operation (e.g., from the OS 112, an application 113, the data 115, etc.). In addition and/or alternatively, the computing device 110 may trigger the card reader 119 based on periodically polling the card reader 119. More generally, the computing device 110 may trigger the card reader 119 to engage in communications using any feasible method.

After communication has been established between computing device 110 and contactless card 101, the applet 103 executing on a processor (not pictured) of the contactless card 101 generates and transmits encrypted data 105 to the computing device 110 via the communications interface 107. For example, the applet 103 of the contactless card 101 may use a cryptographic algorithm to generate a cryptographic payload of encrypted data 105 based at least in part on the private key 104 stored in the memory 102 of the contactless card 101. In such an embodiment, the private key 104 and some other piece of data (e.g., a user identifier, an account identifier, etc.) may be provided as the input to the cryptographic algorithm, which outputs the encrypted data 105. Generally, the applet 103 may use any type of cryptographic algorithm and/or system to generate the encrypted data 105, and the use of a specific cryptographic algorithm as an example herein should not be considered limiting of the disclosure. In some embodiments, the applet 103 may perform encryption using a key diversification technique to generate the encrypted data 105. Examples of key diversification techniques are described in U.S. patent application Ser. No. 16/205,119, filed Nov. 29, 2018. The aforementioned patent application is incorporated by reference herein in its entirety.

Once generated, the applet 103 may transmit the encrypted data 105 to the permissions module 114-1 of the computing device 110, e.g., via NFC. In some embodiments, the applet 103 may transmit the permissions data 106-1 to the permissions module 114-1. The permissions module 114-1 may then generate an indication of the requested operation (or provide a received indication from the OS 112 and/or the applications 113) as part of a request 117 that includes the encrypted data 105. The request 117 generally includes the indication of the attempted operation (e.g., an account identifier of the new employee, an indication of the accounting data in the data 151, and an indication of the accounting application 113, etc.) and the encrypted data 105. The permissions module 114-1 may then transmit the request 117 (including the encrypted data 105) to the authentication application 123 of the authentication server 120. In some embodiments, however, the encrypted data 105 is transmitted separate from the request 117.

Once received, the authentication application 123 may then attempt to authenticate the encrypted data 105 received with the request 117. For example, the authentication application 123 may attempt to decrypt the encrypted data 105 using a copy of the private key 104 stored in the memory 122 of the authentication server 120. The private key 104 may be identical to the private key 104 stored in the memory 102 of the contactless card 101, where each contactless card 101 is manufactured to include a unique private key 104 (and the authentication server 120 stores a corresponding copy of each unique private key 104). Therefore, the authentication application 123 may successfully decrypt the encrypted data 105, thereby verifying the encrypted data 105. Although the private key 104 is depicted as being stored in the memory 122, the private key 104 may be stored elsewhere, such as in a secure element and/or a hardware security module (HSM). In such embodiments, the secure element and/or the HSM may decrypt the encrypted data 105 using the private key 104 and a cryptographic function.

For example, as stated, the user identifier of the user requesting to perform an operation may be used to generate the encrypted data 105. In such an example, the authentication application 123 may decrypt the encrypted data 105 using the private key 104 of the authentication server 120. If the result of the decryption yields the user identifier associated with the account of the requesting user in the account data 124, the authentication application 123 verifies the encrypted data 105. If the authentication application 123 is unable to decrypt the encrypted data to yield the expected result (e.g., the user identifier of the account associated with the contactless card 101), the authentication application 123 does not validate the encrypted data 105. Due to the failed verification, the authentication application 123 transmits an indication of the failed validation to the permissions module 114-1, which denies the requested operation (e.g., the request to grant the new employee access to the accounting application 113 and/or the accounting data 151).

If the authentication application 123 validates the encrypted data 105, the authentication application 123 and/or the permissions module 114-2 may determine whether the requesting user has permissions to grant the new employee access to the identified resources. For example, the authentication application 123 and/or the permissions module 114-2 may determine whether the permissions data 106-3 for the requesting user in the account data 124 (and/or permissions data 106-1, 106-2 received from the computing device 110) indicates whether the administrator has permissions to grant access to the new employee.

Figure 1B:
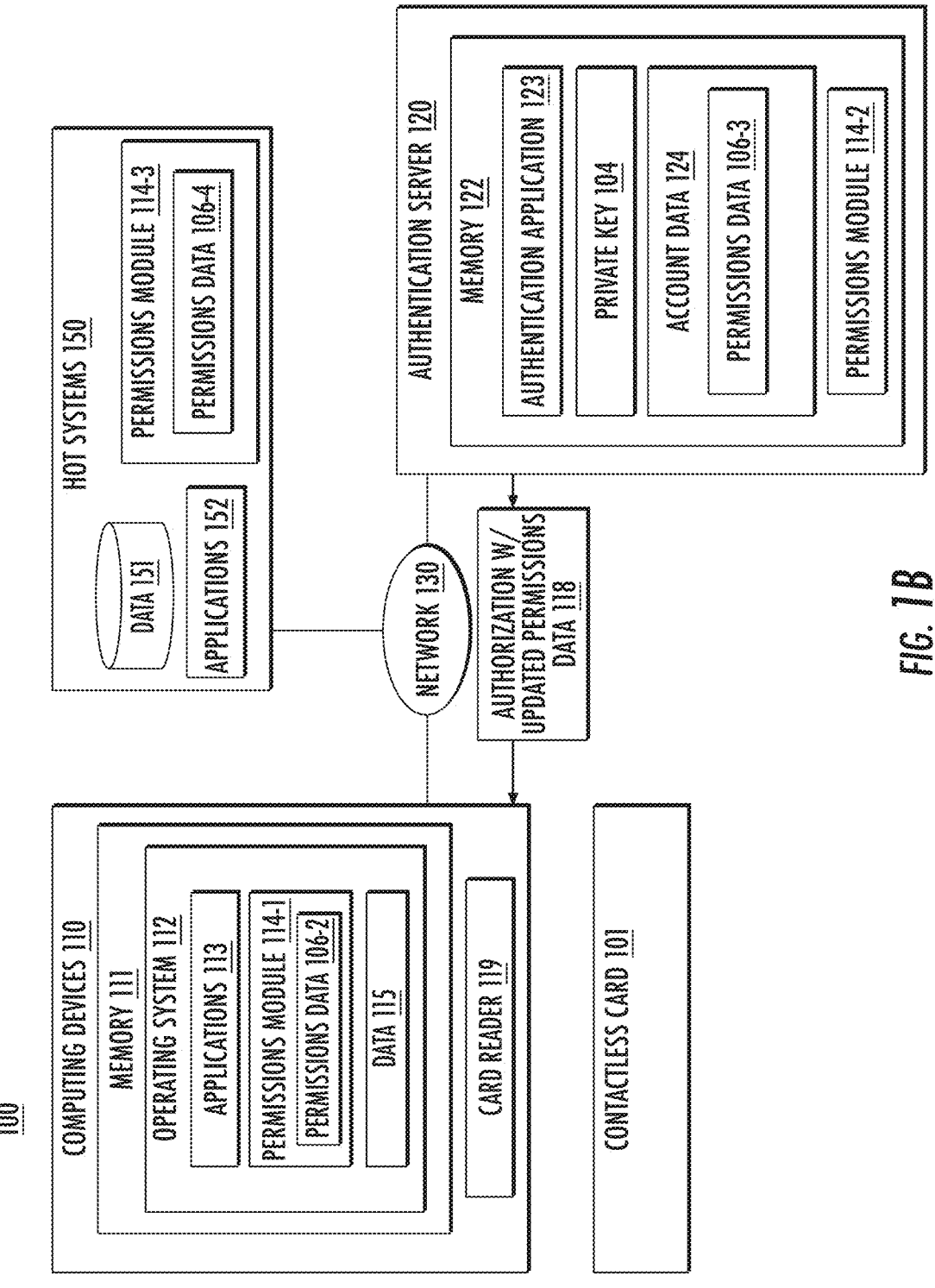

FIG. 1B depicts an embodiment where the authentication application 123 and/or the permissions module 114-2 has determined that the permissions data 106 reflects that the administrator has permissions to grant access to the new employee. In response, the authentication application 123 and/or the permissions module 114-2 may transmit an authorization 118 to the permissions module 114-1 of the computing device 110. Furthermore, the authentication application 123 and/or the permissions module 114-2 may update the permissions data 106-3 of the new employee to reflect that the new employee may access the accounting application 113 and the accounting data in the data 151. Therefore, the authorization 118 may include the updated permissions data 106. The permissions module 114-1 and/or the permissions application 113 may then output an indication of the authorization to the administrator. The permissions module 114-1 may further update the permissions data 106-1 in the contactless card 101, e.g., when the contactless card 101 is subsequently tapped to the device 110.

If, however, the authentication application 123 and/or the permissions module 114-2 determines that the permissions data 106 reflects that the administrator does not have permissions to grant access to the new employee, the authentication application 123 and/or the permissions module 114-2 may deny the requested operation. In such an embodiment, the authentication application 123 and/or the permissions module 114-2 would transmit an indication of the denial to the permissions module 114-1, which in turn may output the indication of the denial to the administrator.

In some embodiments, the permissions module 114-1 executing on the computing device 110 may determine whether the permissions data 106-2 (and/or the permissions data 106-1 of the contactless card 101) reflects whether the administrator has permissions to grant access to the new employee. Therefore, in such embodiments, the permissions module 114-1 determines whether the permissions data 106-2 (and/or the permissions data 106-1 of the contactless card 101) reflects whether the administrator has permissions to grant access to the new employee responsive to receiving an indication that the authentication application 123 has validated the encrypted data 105. Similarly, if the request is to access a resource of the host systems 150, the permissions module 114-3 may determine whether the permissions data 106-4 (and/or permissions data 106-1, 106-2 received from the requesting computing device 110) reflects whether the administrator has permissions to grant access to the new employee responsive to receiving an indication that the authentication application 123 has validated the encrypted data 105.

The technique described above may be used for any type of attempted operation in the system 100. For example, if the new employee subsequently attempts to open the accounting application 113 using their computing device 110, the permissions module 114-1 would require the new employee to tap their contactless card 101 to the computing device 110. In response, the applet 103 would generate encrypted data 105 using the private key 104 and the account identifier of the new employee. The permissions module 114-1 would then receive the encrypted data 105 and transmit the encrypted data 105 as part of a request to access the accounting application 113. The authentication application 123 may then attempt to verify the encrypted data 105 as described above. If the verification of the encrypted data 105 is successful, the authentication application 123 and/or the permissions module 114-2, may permit and/or deny the requested access to the accounting application 113 based on the permissions data 106 in the account data 124 for the new employee.

Although FIGS. 1A-1B are described with reference to an example business organization, the disclosure is equally applicable to other groups, such as families, educational institutions, and the like. For example, a parent may wish to provide their child with limited access to a checking account. In such an example, the parent may use an account management application 113 to delegate access to the checking account according to one or more rules. The rules may include spending limits, merchant restrictions, time limits, and/or geographical limits. The permissions module 114-1 may then instruct the parent to tap their contactless card 101 to the computing device 110 to generate encrypted data 105, which may be validated by the authentication application 123. Once validated, the permissions data 106 for the parent's account (and/or a subaccount generated for the child) may be updated to reflect that the child is able to use funds in the checking account according to the rules specified by the parent. In one embodiment, a virtual account number may be generated for the child's account. The virtual account number may be tied to the parent's checking account and be restricted based on the rules specified by the parent.

Figures 2A, 2B:
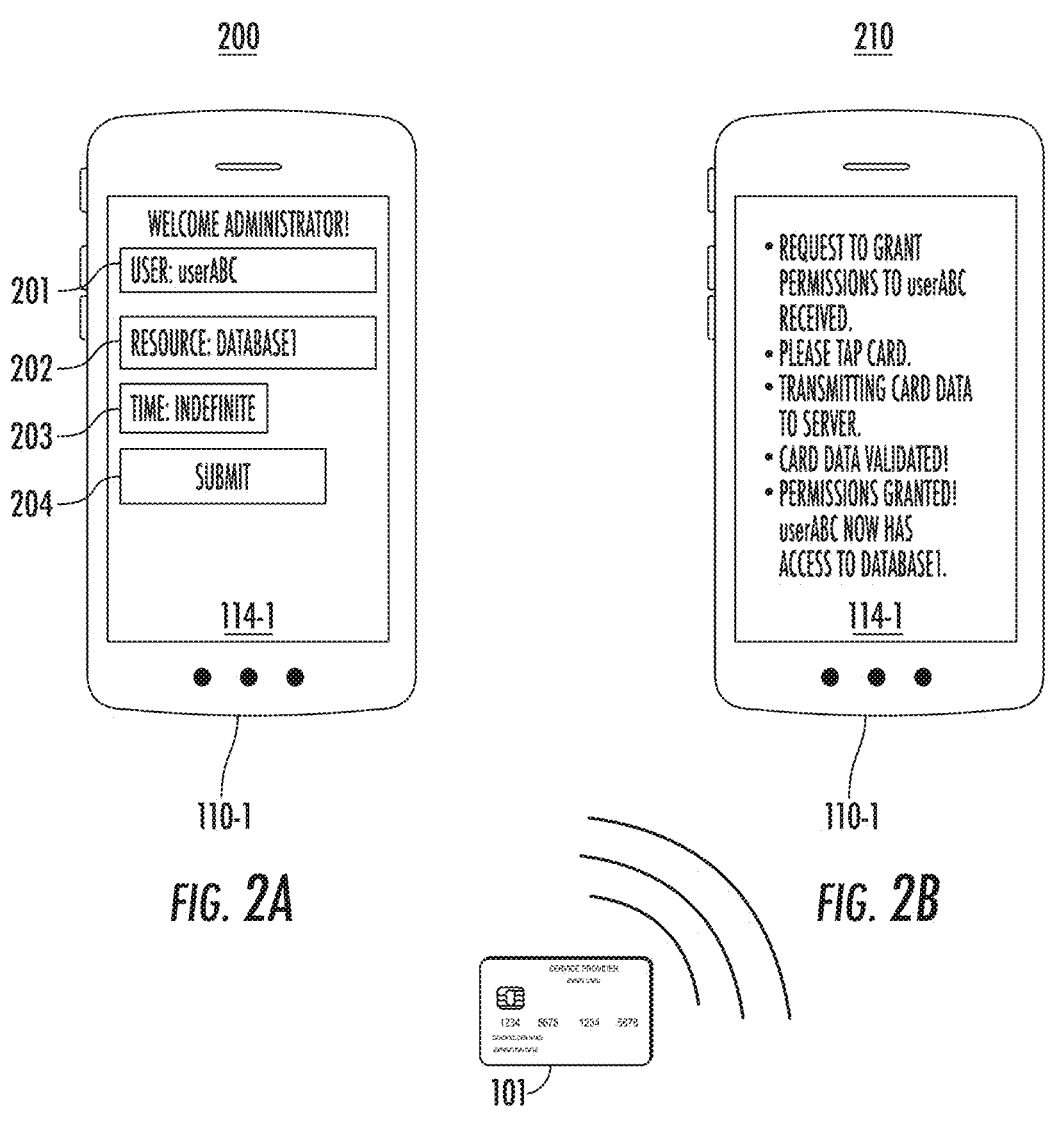
FIGS. 2A-2B illustrate embodiments of delegated administration of permissions using a contactless card.

FIG. 2A is a schematic 200 depicting an example embodiment of tapping the contactless card 101 for delegated administration of permissions. As shown, the permissions module 114-1 executing on a computing device 110-1 displays a graphical user interface (GUI) to delegate permissions. Although depicted as part of the permissions module 114-1, the GUI may be part of a different application 113. As shown, the GUI includes form fields 201-203. More specifically, a user field 201 corresponds to a user to whom permissions are being delegated, a resource field 202 corresponds to a resource for which permissions are being delegated, and time field 203 corresponds to an amount of time the permissions are being delegated for. Therefore, as shown, the user has entered an example user "userABC" in field 201, an example resource "database1" (e.g., corresponding to data 151) in field 202, and an indefinite time duration in field 203. The user may then select the submit button 204.

FIG. 2B is a schematic 210 depicting an embodiment where the user has selected the submit button 204 in FIG. 2A. As shown, the permissions module 114-1 instructs a user to tap the contactless card 101 to the computing device 110-1 to complete the delegation of permissions to userABC. As stated, once the user taps the contactless card 101 to the computing device 110-1, the contactless card 101 generates the encrypted data 105 and transmits the encrypted data 105 to the permissions module 114-1. In some embodiments, the contactless card 101 transmits the permissions data 106-1 to the permissions module 114-1. The permissions module 114-1 may generate a request package specifying the requested permissions (e.g., indefinite access to database 1 for userABC). The permissions module 114-1 then transmits the request and encrypted data 105 to the authentication server 120. In some embodiments, the permissions module 114-1 may transmit the permissions data 106-1 and/or 106-2 to the authentication application 123.

The authentication application 123 may then verify the encrypted data 105 by decrypting the encrypted data 105 with the private key 104 of the server 120. Once verified, the authentication application 123 and/or the permissions module 114-2 determines whether the requesting user has permissions to give userABC access to the database. As stated the authentication application 123 and/or the permissions module 114-2 may determine whether the requesting user has permissions based on the permissions data 106, which may include the permissions data 106-1, 106-2, 106-3 and/or 106-4. If the requesting user has permissions, the authentication application 123 and/or the permissions module 114-2 may update the permissions data 106 for the target user (userABC in this example) to reflect the indefinite access to database1. The permissions data 106-1, 106-2, 106-3, and/or 106-4 may each be updated to reflect that userABC has indefinite access to database1.

FIG. 3A is a schematic 300 illustrating an embodiment where a user may request the grant of permissions from another user. As shown, an example application 113 executing on a computing device 110-1 may include a GUI with form fields 301-303. Although depicted being outputted by the application 113, the form fields 301-303 may be outputted by the permissions module 114-1 of the computing device 110-1. More specifically, a user field 301 corresponds to a user who is requesting permissions, a resource field 302 corresponds to a resource for which permissions are being requested, and time field 303 corresponds to an amount of time the permissions are being requested for. Therefore, as shown, the user has entered an example user "userABC" in field 301, an example resource "$20,000 spending limit" in field 302, and a one-month time duration in field 303. In some embodiments, the spending limit may be associated with an application 113, an account, and the like. The user may then select the submit button 304.

FIG. 3B is a schematic 310 depicting an embodiment where the user has selected the submit button 304 in FIG. 3A. As shown, the permissions module 114-1 on the computing device 110-1 instructs a user to tap the contactless card 101 to the computing device 110-1 to process the request for permissions for userABC to have a $20,000 spending limit. As stated, once the user taps the contactless card 101 to the computing device 110, the contactless card 101 generates the encrypted data 105 and transmits the encrypted data 105 to the permissions module 114-1. In some embodiments, the contactless card 101 transmits the permissions data 106-1 to the permissions module 114-1. In at least one embodiment, the applet 103 of the contactless card 101 generates a digital signature using the private key 104. The digital signature may sign the encrypted data 105 and/or permissions data 106-1. The contactless card 101 may then transmit the digital signature with the encrypted data 105 and/or the permissions data 106-1.

The permissions module 114-1 may then generate a request package specifying the requested permissions (e.g., userABC to have a $20,000 spending limit for one month). The request may further specify an account associated with the requested spending limit, an account of the requesting user (e.g., the account number of the contactless card 101 of userABC), an application 113 associated with the requested spending limit, etc. The permissions module 114-1 then transmits the request, digital signature, and encrypted data 105 to the authentication server 120. In some embodiments, the permissions module 114-1 may transmit the permissions data 106-1 and/or 106-2 to the authentication application 123.

The authentication application 123 may then verify the encrypted data 105 by decrypting the encrypted data 105 with the private key 104 of the server 120. The authentication application 123 may also verify the digital signature by decrypting the digital signature using a public key associated with the contactless card 101 and stored by the server 120. Once the authentication application 123 verifies the encrypted data 105 the digital signature the authentication application 123 and/or the permissions module 114-2 may transmit a notification (or another indication) to an administrator (or other user) with sufficient permissions to approve the request.

Figures 3C, 3D:
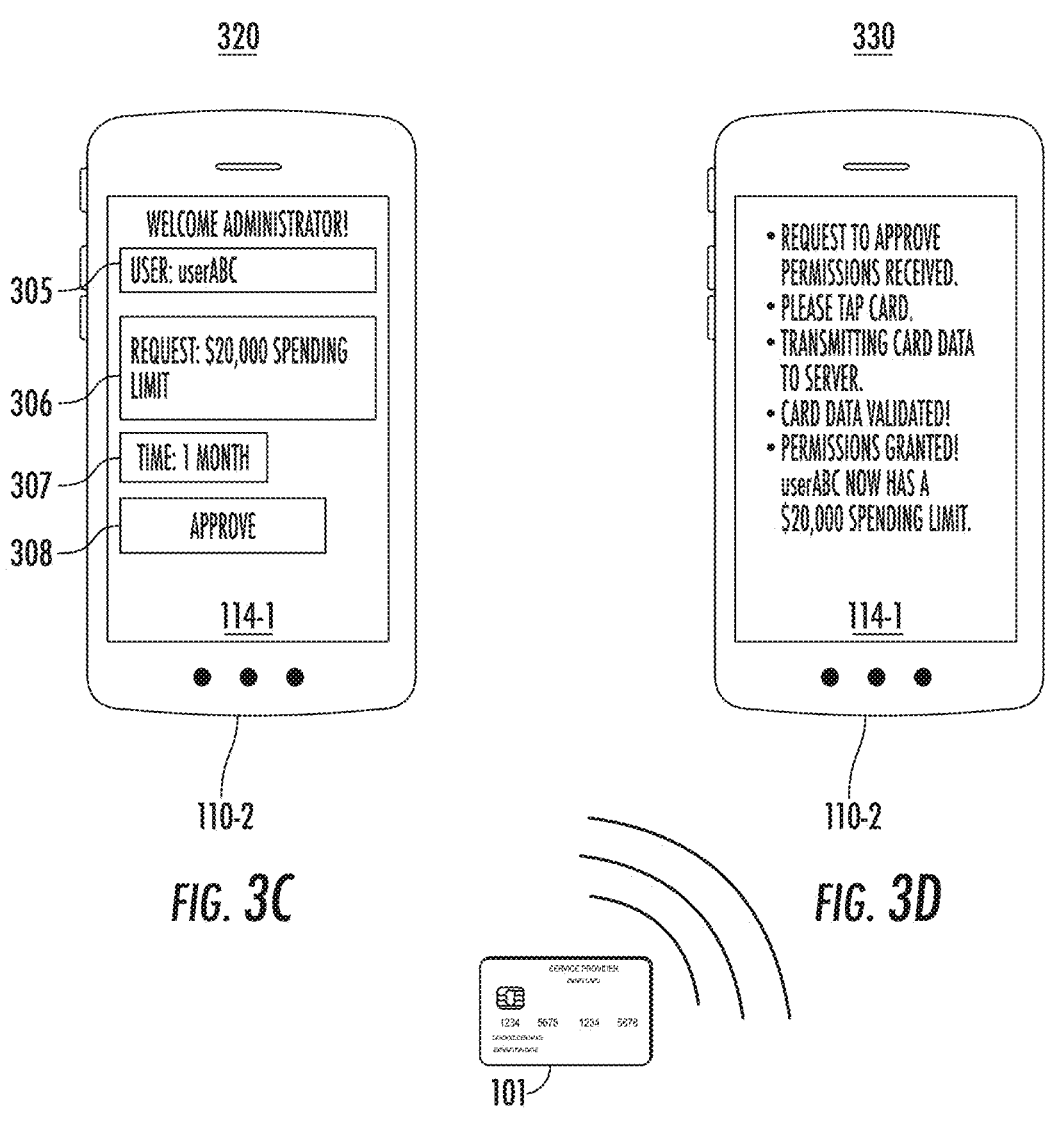

FIG. 3C is a schematic 320 illustrating an embodiment where the permissions module 114-1 executing on a computing device 110-2 of an administrator has received the notification from the authentication application 123 and/or the permissions module 114-2 as described above with reference to FIG. 3B. As shown, the permissions module 114-1 outputs a GUI with fields 305-307 reflecting the requested user, requested permission, and time duration, respectively. The administrator may select the approve button 308 to initiate approval of the requested spending limit.

FIG. 3D is a schematic 330 illustrating an embodiment where the administrator has selected approve button 308 in FIG. 3C. As shown, the permissions module 114-1 instructs a user to tap the contactless card 101 to the computing device 110-2 to complete the delegation of permissions to userABC. As stated, once the user taps the contactless card 101 to the computing device 110-2, the contactless card 101 generates the encrypted data 105 and transmits the encrypted data 105 to the permissions module 114-1. In some embodiments, the contactless card 101 transmits the permissions data 106-1 of the administrator to the permissions module 114-1. The permissions module 114-1 may generate a request package specifying the requested permissions (e.g., a $20,000 spending limit for userABC for one month). The request may further specify an account associated with the requested spending limit (e.g., the account number of the contactless card 101 of userABC), an account of the requesting user, an application 113 associated with the requested spending limit, etc. The permissions module 114-1 then transmits the request and encrypted data 105 to the authentication server 120. In some embodiments, the permissions module 114-1 may transmit the permissions data 106-1 and/or 106-2 for the administrator to the authentication application 123.

The authentication application 123 may then verify the encrypted data 105 by decrypting the encrypted data 105 with the private key 104 of the server 120. Once verified, the authentication application 123 and/or the permissions module 114-2 determines whether the requesting user has permissions to give userABC access to the requested spending limit. As stated, the authentication application 123 and/or the permissions module 114-2 may determine whether the administrator has permissions based on the permissions data 106, which may include the permissions data 106-1, 106-2, 106-3 and/or 106-4. If the administrator has permissions, the authentication application 123 and/or the permissions module 114-2 may update the permissions data 106 for the target user (userABC in this example) to reflect the $20,000 spending limit for 1 month. The permissions data 106-1, 106-2, 106-3, and/or 106-4 may each be updated to reflect that userABC has a $20,000 spending limit for 1 month. As stated in some embodiments, a virtual account number may be generated for userABC for the stated spending limit and duration. The virtual account number may further be restricted based on merchant, geographic location, and/or any other parameter. In some embodiments, the account number of the contactless card 101 of the user (userABC in this example) may be granted the $20,000 spending limit for one month.

Figures 3E, 3F:
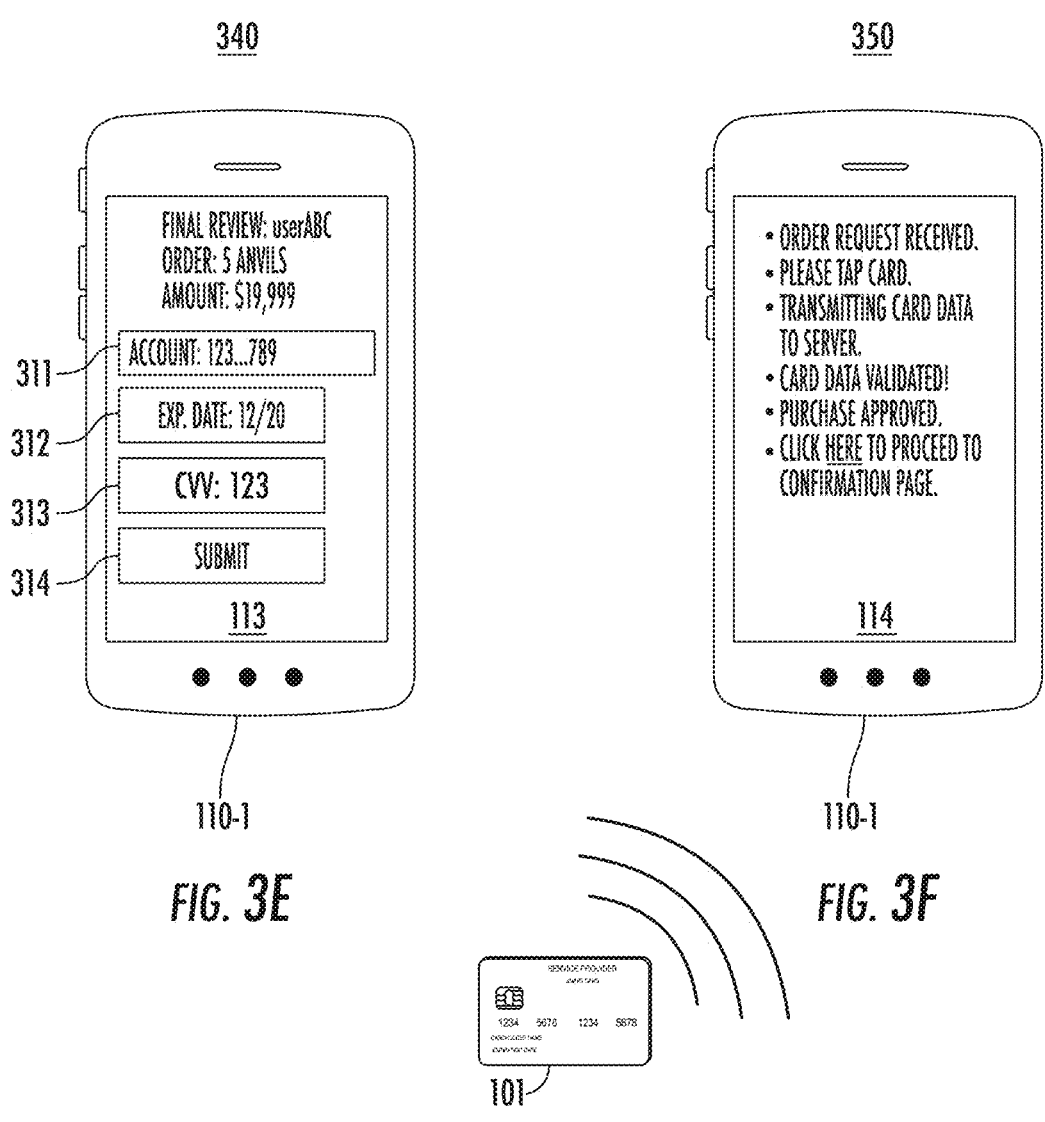

FIG. 3E is a schematic 340 illustrating an embodiment where the userABC attempts to make a purchase using an application 113. The application 113 may be a merchant application, web browser, or any other application configured to process a payment and/or transfer funds. As shown, the application 113 includes form payment fields 311-313 corresponding to an account number field, expiration date field, and card verification value (CVV) field, respectively. As shown, the user has entered an example account number, expiration date, and CVV into fields 311-313, respectively. The account number may be a limited-time use virtual account number and/or the account number of the contactless card 101 of the user (userABC in this example).

FIG. 3F is a schematic 350 depicting an embodiment where the user has selected the submit button 314 in FIG. 3E. As shown, the permissions module 114-1 instructs a user to tap the contactless card 101 to the computing device 110-1 to complete the requested purchase. As stated, once the user taps the contactless card 101 to the computing device 110-1, the contactless card 101 generates the encrypted data 105 and transmits the encrypted data 105 to the permissions module 114-1. In some embodiments, the contactless card 101 transmits the permissions data 106-1 to the permissions module 114-1. The permissions module 114-1 may generate a request package specifying the requested permissions (e.g., a purchase totaling $19,999). The permissions module 114-1 then transmits the request and encrypted data 105 to the authentication server 120. In some embodiments, the permissions module 114-1 may transmit the permissions data 106-1 and/or 106-2 to the authentication application 123.

The authentication application 123 may then verify the encrypted data 105 by decrypting the encrypted data 105 with the private key 104 of the server 120. Once verified, the authentication application 123 and/or the permissions module 114-2 determines whether the requesting user has permissions to spend $19,999. As stated the authentication application 123 and/or the permissions module 114-2 may determine whether the requesting user has permissions based on the permissions data 106, which may include the permissions data 106-1, 106-2, 106-3 and/or 106-4. The permissions data 106 may reflect an available spending limit for the requesting user and the 1-month duration for the spending limit. If the requesting user has a sufficient spending limit and is within the 1-month period for the spending limit as reflected by the permissions data 106, the authentication application 123 and/or the permissions module 114-2 may approve the requested purchase. Otherwise, the requested purchase is denied.

If approved, the authentication application 123 and/or the permissions module 114-2 may update the permissions data 106 for the target user (userABC in this example) to reflect that $19,999 has been spent by the userABC. Generally, the permissions data 106-1, 106-2, 106-3, and/or 106-4 may each be updated to reflect that $19,999 has been spent by the userABC. The authentication application 123 and/or the permissions module 114-2 may then transmit an indication of the approval to the permissions module 114-1 on the computing device 110-1. The permissions module 114-1 may then transmit an indication of the approval to the application 113, which processes the purchase.

Figure 4:
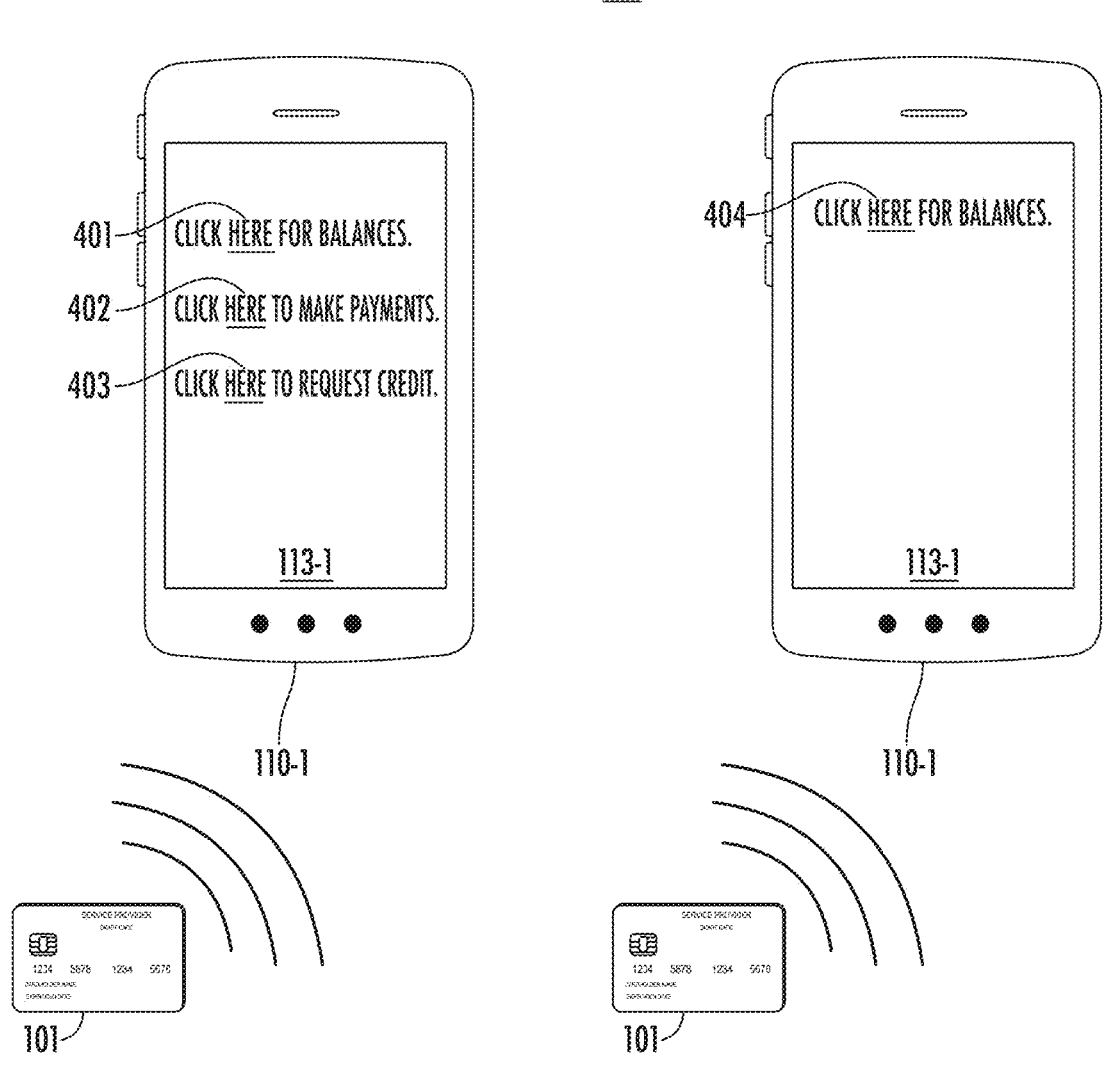
FIG. 4 illustrates an embodiment of delegated administration of permissions using a contactless card.

FIG. 4 is a schematic 400 depicting an embodiment of using a contactless card for permissions on a first computing device 110-1 and a second computing device 110-2. As shown, the computing devices 110-1, 110-2 each execute an example application 113-1. However, the functionality provided by the application 113-1 on the devices 110-1, 110-2 are different. As stated, the permissions data 106-1 of the contactless cards 101 may be used to control the functionality, appearance, and/or any other attribute of an application.

For example, when executing the application 113-1 on the device 110-1, the permissions module 114-1 may output an indication specifying to tap the contactless card 101-1 to the device 110-1. Doing so may cause the contactless card 101-1 to generate and transmit encrypted data 105 for validation by the authentication application 123 as described above. Furthermore, as stated, the contactless card 101-1 may transmit the permissions data 106-1 to the permissions module 114-1 of the device 110-1. The permissions module 114-1 may then transmit, to the application 113-1, the permissions data 106-1 and/or an indication of which features of the application 113-1 to expose. In response, the application 113-1 exposes three features associated with links 401-403 on the device 110-1. For example, as shown, link 401 is associated with an interface to view account balances that can be accessed by the user associated with contactless card 101-1, while link 402 is associated with a payment interface that can be accessed by the user associated with contactless card 101-1, while link 403 is associated with an interface that can be accessed by the user associated with contactless card 101-1 to request credit.

However, as shown, when the user associated with contactless card 101-2 taps the contactless card 101-2 to computing device 110-2, the permissions data 106-1 permits exposure of more limited functions of the application 113-1. For example, as shown, the application 113-1 on the computing device 110-2 exposes, based on the permissions data 106-2 received from the contactless card 101-2, the interface associated with link 404, namely the interface to view account balances. However, the application 113-1 on the computing device 110-2 does not expose other interface (e.g., the payments interface, the credit request interface, etc.).

Therefore, as stated, the permissions module 114-1 restricts and/or permits user access to different functions, pages, and/or any other attribute of the application 113-1 based on the permissions data 106 associated with the user associated a given contactless card 101-1. In some embodiments, the permissions data 106-1 stored in the contactless card is clear text that may be directly read by the computing devices 110. In such embodiments, the generate encrypted data 105 may not be generated and/or verified by the authentication server 120. Such an embodiment is useful, for example, when a given device 110 does not have Internet access. However, in some such embodiments, the user may be required to provide local login credentials on the computing device 110 to improve security.

Figure 5:
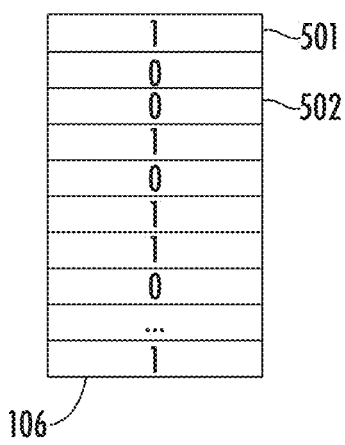
FIG. 5 illustrates an embodiment of permissions data.

FIG. 5 depicts an example portion of permissions data 106, according to one embodiment. As shown, the permissions data 106 is a vector of binary values. Each element of the permissions data 106 may specify whether the associated user is permitted access to an associated resource and/or perform operation. For example, as shown, the value of "1" in element 501 of the permissions data 106 may indicate the user is permitted to access a resource and/or perform an operation. Similarly, the value of "0" in element 502 of the permissions data 106 may indicate the user is not permitted to access a resource and/or perform an operation. As stated, the elements of permissions data 106 (including elements 501, 502) may be associated with granting, modifying, and/or revoking permissions to other users, executing applications (e.g., the applications 113 of the computing devices 110, the applications 152 of the host systems 150, etc.), accessing a specific feature and/or interface of an application, accessing data (e.g., the data 115 of the computing devices 110, the data 151 of the host systems 150, etc.), and performing operations using an application and/or data.

FIG. 6 illustrates an embodiment of a logic flow 600. The logic flow 600 may be representative of some or all of the operations executed by one or more embodiments described herein. For example, the logic flow 600 may include some or all of the operations performed for delegated administration of permissions using a contactless card 101. Embodiments are not limited in this context.

As shown, the logic flow 600 begins at block 605, where one or more contactless cards 101 are programmed to include a unique private key 104 and permissions data 106-1 at the time of manufacture. For example, the permissions data 106-3 in the account data 124 of the associated user may be programmed into the memory 102 of the contactless card 101 for the user at the time of manufacture. At block 610, the permissions module 114-1 executing on a computing device 110 may receive a request from a first account to grant, to a second account, permissions to a computing resource and/or to perform an operation. For example, the user of the first account may wish to grant the user of the second account access to the data 151 and/or applications 152 of the host systems 150. At block 615, a user associated with the first account taps the contactless card 101 to the computing device 110 to cause the contactless card 101 to generate and transmit encrypted data 105. At block 620, the applet 103 of the contactless card 101 may then generate the encrypted data 105 using the private key 104, input data (e.g., the user identifier), and a cryptographic algorithm. At block 625, the applet 103 may transmit the encrypted data 105 and the permissions data 106-1 to the permissions module 114-1 of the computing device 110.

At block 630, the permissions module 114-1 of the computing device 110 transmits the encrypted data 105 and a request to grant specified permissions to the second account to the authentication server 120. For example, the request may specify to grant, by the first account, permissions to the second account to access the specified data 151 and/or applications 152 of the host systems 150. In some embodiments, the permissions module 114-1 may transmit the permissions data 106-1 and/or the permissions data 106-2 to the authentication server 120. In other embodiments, the permissions module 114 may refrain from transmitting the permissions data to the server 120. At block 635, the authentication application 123 decrypts the encrypted data 105 using the private key 104 of the authentication server 120 to validate the encrypted data 105.

At block 640, the authentication application 123 determines that the first account has permissions to grant the requested access to the second account. For example, the authentication application 123 may reference the permissions data 106-3 for the first account stored in the account data 124 to determine whether the first account has the required permissions. As another example, the authentication application 123 may use the received permissions data 106-1 and/or permissions data 106-2. At block 645, the authentication application 123 updates the permissions data 106 for the second account to reflect the grant of access to the specified resources. For example, the authentication application 123 may update the permissions data 106-3 for the second account stored in the account data 124 to reflect that the second account is permitted to access the specified data 151 and/or applications 152 of the host systems 150. Similarly, the updates may be pushed to other instances of the permissions data 106 for the second account (e.g., the permissions data 106-1 on the contactless card 101 of the user of the second account, the permissions data 106-2 on the computing device 110 of the user of the second account, the permissions data 106-4 of the host systems 150, etc.).

At block 650, the authentication application 123 may transmit, to the permissions module 114-1, an indication of the verification of the encrypted data 105 and the grant of permissions to the second account. In some embodiments, the authentication application 123 may transmit, to the permissions module 114-1, the permissions data 106-3 for the second account. At block 655, the user of the second account may tap their contactless card 101 to a computing device 110 to update the permissions data 106-1 stored in the contactless card 101 to reflect the grant of permissions.

Figure 7:
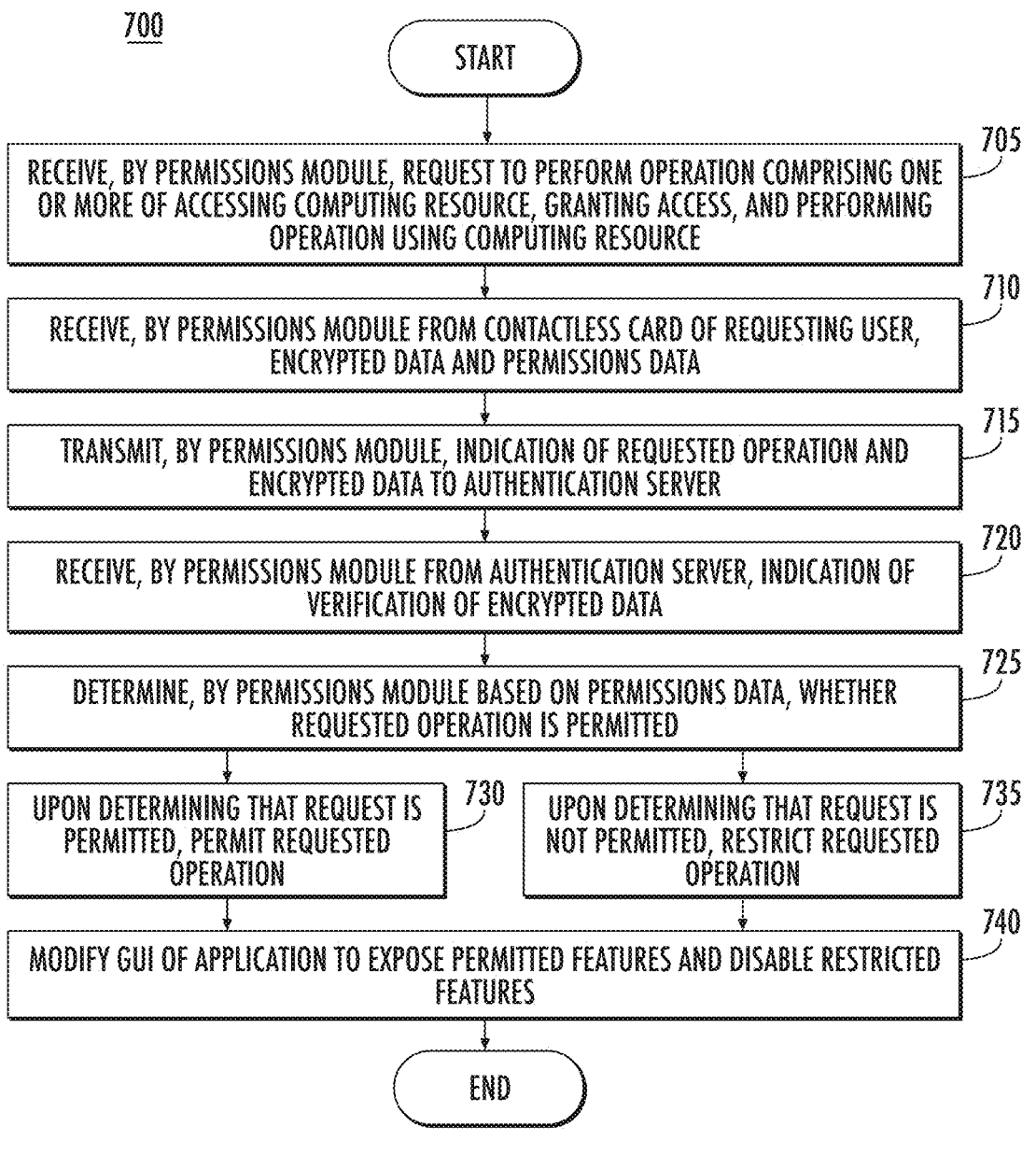
FIG. 7 illustrates an embodiment of a second logic flow.

FIG. 7 illustrates an embodiment of a logic flow 700. The logic flow 700 may be representative of some or all of the operations executed by one or more embodiments described herein. For example, the logic flow 700 may include some or all of the operations to modify application features based on permissions data. Embodiments are not limited in this context.

As shown, the logic flow 700 begins at block 705, where the permissions module 114-1 executing on a computing device 110 receives a request to perform an operation, e.g., from an application 113 and/or the OS 112. The operation may include, but is not limited to, accessing a computing resource, granting permissions, modifying permissions, revoking permissions, and/or performing an operation using a computing resource. At block 710, a user associated with the request taps a contactless card 101 to the computing device 110 to cause the contactless card 101 to generate and transmit encrypted data 105. The applet 103 of the contactless card 101 may then generate the encrypted data 105 using the private key 104, input data (e.g., the user identifier), and a cryptographic algorithm. The applet 103 may transmit the encrypted data 105 and the permissions data 106-1 to the permissions module 114-1 of the computing device 110.

At block 715, the permissions module 114-1 of the computing device 110 transmits the encrypted data 105 and an indication of the requested operation to the authentication server 120. In some embodiments, the permissions module 114-1 may transmit the permissions data 106-1 and/or the permissions data 106-2 to the authentication server 120. The authentication application 123 may then decrypt the encrypted data 105 using the private key 104 of the authentication server 120 to validate the encrypted data 105. At block 720, the permissions module 114-1 receives, from the authentication server 120, an indication of the verification of the encrypted data 105. The permissions module 114-1 may further receive the permissions data 106-3 of the requesting account from the authentication server 120.

At block 725, the permissions module 114-1 determines whether the requested operation is permitted based on the permissions data 106-1, 106-2, 106-3, and/or 106-4 for the requesting account. At block 730, the permissions module 114-1 permits the requested operation upon determining the permissions data 106 specifies that the operation is permitted (e.g., based on a lookup of the entry of permissions data 106 associated with the requested operation). If, however, the permissions data 106 does not permit the requested operation, at block 735, the permissions module 114-1 restricts performance of the requested operation. For example, if the requested operation is to open an application, the permissions module 114-1 would restrict the application from being opened. Furthermore, if the requested operation is to open an application and/or a specific portion of an application, at block 740, the permissions module 114-1 and/or the application may modify the GUI of the application to expose features permitted by the permissions data 106 and disable features that are not permitted by the permissions data 106.

FIG. 8 illustrates an embodiment of a logic flow 800. The logic flow 800 may be representative of some or all of the operations executed by one or more embodiments described herein. For example, the logic flow 800 may include some or all of the operations performed by the applet 103 of the contactless card 101. Embodiments are not limited in this context.

As shown, the logic flow 800 begins at block 805, where the applet 103 of the contactless card 101 receives an identifier of a requesting device 110. The identifier may be a media access control (MAC) address, software fingerprint, device identifier, and the like. The requesting device 110 may be any device including an instance of the permissions module 114-1 that is brought within communications range of the contactless card 101. At block 810, the applet 103 that the received identifier is specified as an authorized identifier in the memory 102 of the contactless card. At block 815, the applet 103 generates encrypted data 105 based on the private key, input data, and a cryptographic function. At block 820, the contactless card 101 transmits the encrypted data 105 and the permissions data 106-1 of the contactless card 101 to the requesting device 110.

Figure 9:
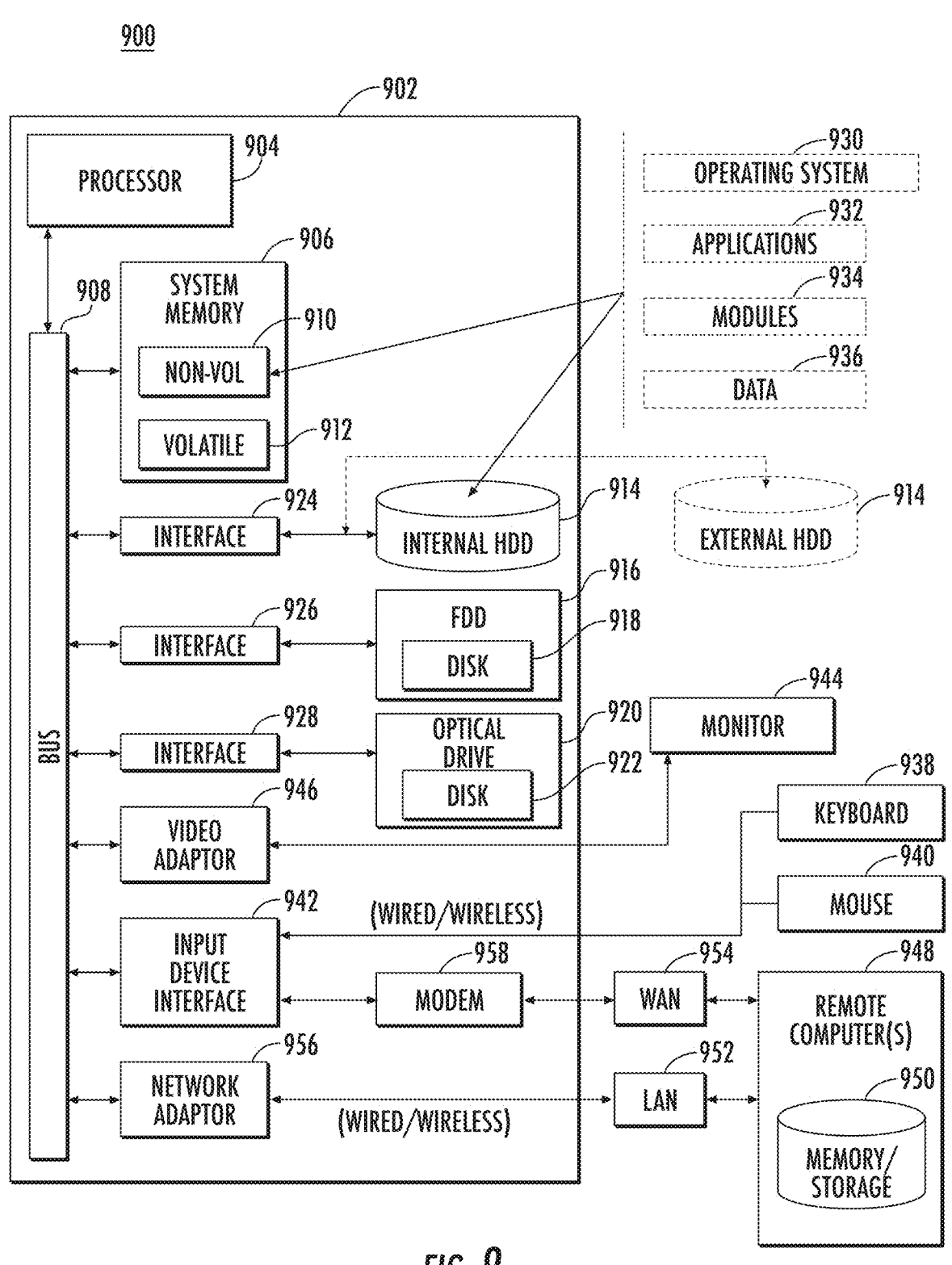
FIG. 9 illustrates an embodiment of a computing architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of the contactless card 101, computing devices 110, authentication server 120, and/or the host systems 150 of the system 100. The embodiments are not limited in this context. More generally, the computing architecture 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E) ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, e.g., the applet 103, private keys 104, encrypted data 105, permissions data 106, operating system 112, applications 113, the permissions module 114, the authentication application 123, the host systems 150, data 151, and/or applications 152.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 952 and the WAN 954.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10A:
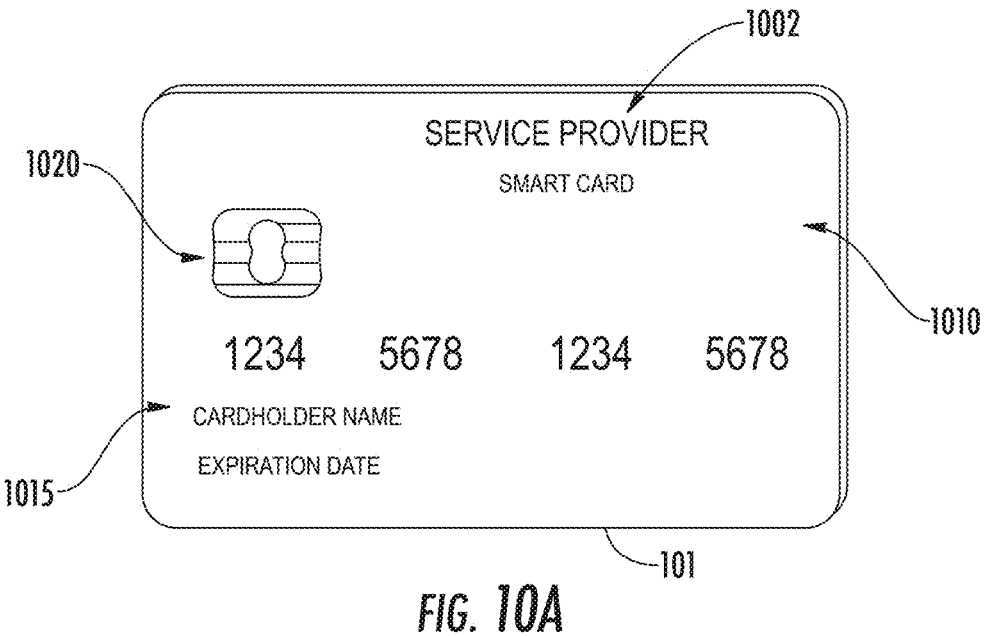
FIGS. 10A-10B illustrate an example contactless card.

FIG. 10A illustrates a contactless card 101, which may comprise a payment card, such as a credit card, debit card, and/or a gift card. As shown, the contactless card 101 may be issued by a service provider 1002 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 1010, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 1015 displayed on the front and/or back of the card, and a contact pad 1020. The contact pad 1020 may be configured to establish contact with another communication device, such as the mobile devices 110, a user device, smart phone, laptop, desktop, or tablet computer. The contactless card 101 may also include processing circuitry, antenna and other components not shown in FIG. 10A. These components may be located behind the contact pad 1020 or elsewhere on the substrate 1010. The contactless card 101 may also include a magnetic strip or tape, which may be located on the back of the card (not shown in FIG. 10A).

Figure 10B:
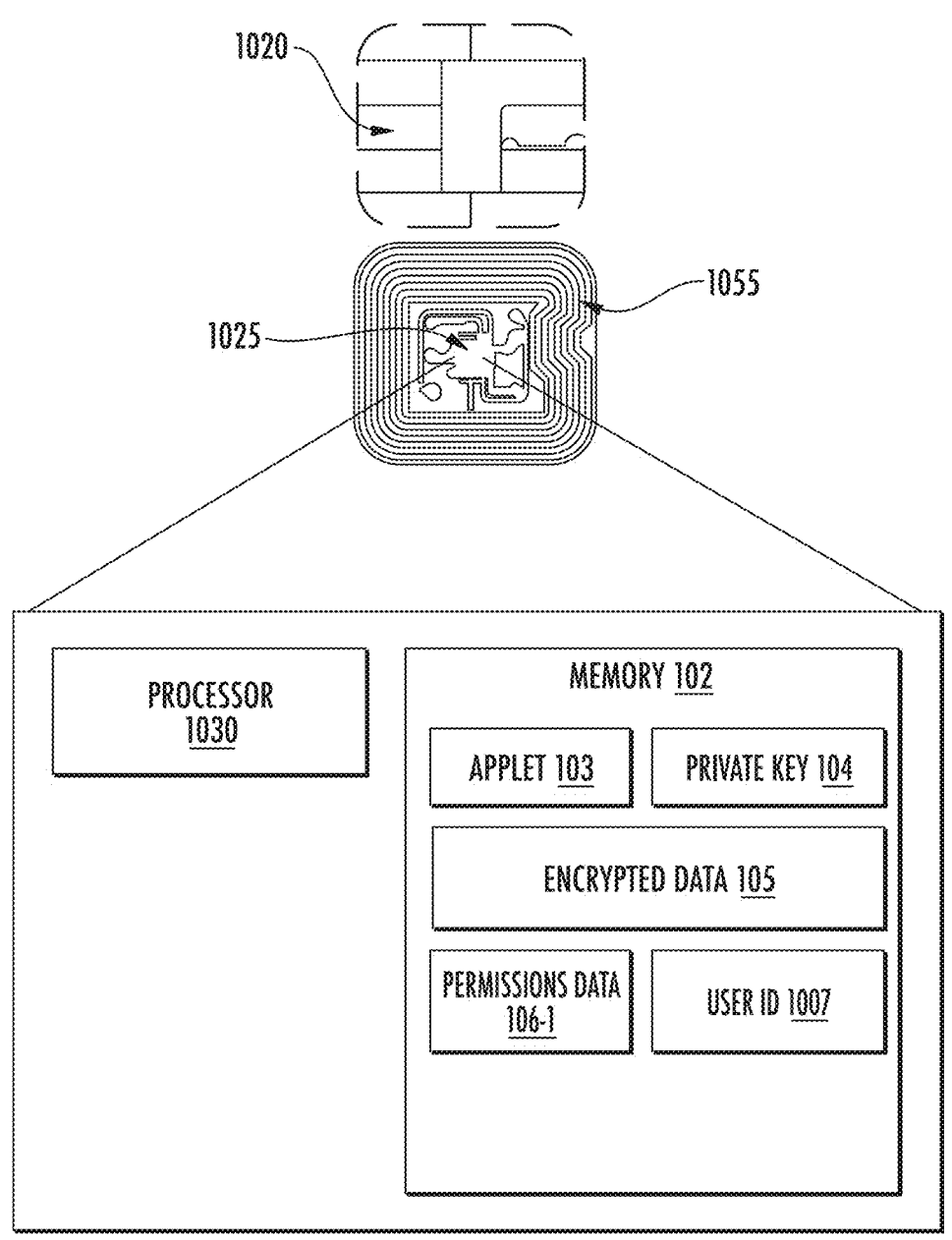

As illustrated in FIG. 10B, the contact pad 1020 of contactless card 101 may include processing circuitry 1025 for storing and processing information, including a microprocessor 1030 and the memory 102. It is understood that the processing circuitry 1025 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to one or more of the applets 103, a private key 104, the encrypted data 105, the permissions data 106-1, and one or more user identifiers (IDs) 1007. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The user ID 1007 may comprise a unique alphanumeric identifier assigned to a user of the contactless card 101, and the identifier may distinguish the user of the contactless card from other contactless card users. In some examples, the user ID 1007 may identify both a customer and an account assigned to that customer and may further identify the contactless card associated with the customer's account. In some embodiments, the applets 103 may use the customer ID 1007 as input to a cryptographic algorithm with the private key 104 to generate the encrypted data 105.

The processor and memory elements of the foregoing exemplary embodiments are described with reference to the contact pad, but the present disclosure is not limited thereto. It is understood that these elements may be implemented outside of the pad 1020 or entirely separate from it, or as further elements in addition to processor 1030 and memory 102 elements located within the contact pad 1020.

In some examples, the contactless card 101 may comprise one or more antennas 1055. The one or more antennas 1055 may be placed within the contactless card 101 and around the processing circuitry 1025 of the contact pad 1020. For example, the one or more antennas 1055 may be integral with the processing circuitry 1025 and the one or more antennas 1055 may be used with an external booster coil. As another example, the one or more antennas 1055 may be external to the contact pad 1020 and the processing circuitry 1025.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 1055, processing circuitry 1025, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., of the device 110), and produce an NDEF message that comprises a cryptographically secure OTP encoded as an NDEF text tag.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:
1. A system, comprising:
a near-field communication (NFC) reader;
a processor circuit; and

US 12,694,394 B2

21 a memory storing instructions which when executed by
the processor circuit, cause the processor circuit to:
generate a NFC exchange request to request data;
communicate, via the NFC reader, the NFC exchange
request to a NFC interface of a contactless card;
receive, via the NFC reader, a message from the
contactless card comprising the data;
generate a communication based on a communications
protocol, wherein the communication comprises the
data;
transmit the communication to an authentication server
via a network node of a network to determine access
to a computing resource via a computing device;
receive, via the network, from the authentication server,
a result indicating that the authentication server
decrypted the data;
determine, based on the result, that the authentication
server decrypted the data and, based on the data, that
the contactless card is verified and an account has
permissions to access the computing resource;
grant access to a first feature of the computing resource
based on a first element in the data;
provide an indication that the access is granted on a
graphical user interface (GUI) of a display device of
the computing device;
disable access to a second feature of the computing
resource based on a second element in the data; and
access the first feature of the computing resource via
the computing device.
2. The system of claim 1, further comprising communi-
cating an update for the data stored by the contactless card.
3. The system of claim 2, wherein the update for the data
comprises one or more updated elements.
4. The system of claim 1, wherein the data comprises
permissions data encrypted by the contactless card perform-
ing an encryption operation with a key stored on the con-
tactless card.
5. The system of claim 4, wherein the result includes an
indication that the data is verified by the authentication
server.
6. The system of claim 1, wherein the instructions are
further configured to cause the processor circuit to:
initiate a NFC exchange with the contactless card; and
receive the data in the NFC exchange.
7. The system of claim 1, comprising one or more wireless
interfaces configured to operate in accordance with an NFC
protocol, a Bluetooth protocol, a Wi-Fi protocol, or a com-
bination thereof, and the processor circuit is configured to
receive the data via the one or more wireless interfaces.
8. The system of claim 1, wherein the computing resource
is a resource of the computing device or a resource of
another computing device accessible via the computing
device.
9. A computer-implemented method, comprising:
generating a near-field communication (NFC) exchange
request to request encrypted data and permissions data;
communicating, via a NFC reader, the NFC exchange
request to a NFC interface of a contactless card;
receiving, via the NFC reader, a message from the con-
tactless card comprising the encrypted data and per-
missions data;
generating a communication based on a communications
protocol, wherein the communication comprises the
encrypted data and permissions data;
sending the encrypted data and permissions data to a
server, via a network node of a network, to authenticate
access to a computing resource via a computing device;

receiving, via the network, from the server, a result
indicating that the server decrypted the encrypted data;
verifying, based on the result, that the server decrypted
the encrypted data and, based on the permissions data,
that the contactless card is verified and an account has
permissions to access the computing resource;
granting access to a first feature of the computing resource
based on a first element in the permissions data;
disabling access to a second feature of the computing
resource based on a second element in the permissions
data; and
accessing the first feature of the computing resource via
the computing device.
10. The computer-implemented method of claim 9,
wherein the encrypted data comprises the permissions data
encrypted by the contactless card performing an encryption
operation with a key stored on the contactless card.
11. The computer-implemented method of claim 10, com-
prising:
granting access to the computing resource if the result
indicates the contactless card is authenticated and at
least one element of the permissions data indicates that
at least one feature of the computing resource is per-
mitted; and
preventing access to the computing resource if the result
indicates the contactless card is not authenticated or
elements of the permissions data indicates features are
not permitted.
12. The computer-implemented method of claim 9,
wherein the encrypted data comprises payment data
encrypted by the contactless card performing an encryption
operation with a key stored on the contactless card.
13. The computer-implemented method of claim 12, com-
prising:
enabling the payment if the result indicates the contactless
card is authenticated; and
preventing the payment if the result indicates the contact-
less card is not authenticated.
14. The computer-implemented method of claim 9, com-
prising:
initiating a NFC exchange with the contactless card; and
receiving the encrypted data in the NFC exchange.
15. A non-transitory computer-readable storage medium
storing computer-readable program code that when executed
by a processor causes the processor to:
generate a NFC exchange request to request data;
communicate, via a NFC reader, the NFC exchange
request to a NFC interface of a contactless card;
receive, via the NFC reader, a message from the contact-
less card comprising the data;
generate a communication based on a communications
protocol, wherein the communication comprises the
data;
send the data to an authentication server to verify access
to a computing resource via a computing device, the
data from a contactless card;
receive, from the authentication server via a network node
of a network, a result indicating that the authentication
server decrypted the data, wherein the result includes a
permissions vector;
verify, based on the result, that the authentication server
decrypted the data and that the permissions vector
indicates that the contactless card is verified and that an
account has permissions to access the computing
resource;
grant access to a first feature of the computing resource
based on a first element in the permissions vector;

disable access to a second feature of the computing
   resource based on a second element in the permissions
   vector; and
access the first feature of the computing resource via the
   computing device.

16. The computer-readable storage medium of claim 15,
wherein the program code further causes the processor to
communicate an update for the data stored by the contactless
card, wherein the update for the data comprises the permis-
sions vector with one or more updated elements.

17. The computer-readable storage medium of claim 15,
wherein the
   data comprises permissions data encrypted by the con-
      tactless card performing an encryption operation with a
      key stored on the contactless card.

18. The computer-readable storage medium of claim 16,
wherein the result includes an indication that the data is
validated by the authentication server.

19. The computer-readable storage medium of claim 15,
wherein the program code is further configured to cause the
processor to:
   initiate a NFC exchange with the contactless card; and
   receive the data in the NFC exchange.

20. The computer-readable storage medium of claim 15,
wherein the computing resource is a resource of the com-
puting device or a resource of another computing device
accessible via the computing device.

* * * * *